US005835593A

United States Patent [19]

Tsutsui

[11] Patent Number: 5,835,593

[45] **Date of Patent: *Nov. 10, 1998**

[54] INFORMATION TRANSMITTING APPARATUS AND INFORMATION TRANSMITTING SYSTEM

[75] Inventor: Kyoya Tsutsui, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 540,772

[22] Filed: Oct. 11, 1995

[30] Foreign Application Priority Data

Oct. 27, 1994 [JP] Japan .................................... 6-340657

[51] Int. Cl.[6] ........................................................ H04L 9/00

[52] U.S. Cl. ........................ 380/23; 235/380; 340/825.31; 340/825.34

[58] Field of Search ........................ 380/23–25; 235/380, 235/381; 340/825.31, 825.34

[56] References Cited

U.S. PATENT DOCUMENTS

| | | | |
|---|---|---|---|
| 4,802,218 | 1/1989 | Wright et al. | 380/23 |
| 4,819,267 | 4/1989 | Cargile et al. | 380/23 |
| 4,907,272 | 3/1990 | Hazard et al. | 380/25 |
| 4,974,193 | 11/1990 | Beutelspacher et al. | 380/25 |
| 4,998,279 | 3/1991 | Weiss | 380/23 |
| 5,097,505 | 3/1992 | Weiss | 380/25 |
| 5,192,854 | 3/1993 | Counts | 235/381 |
| 5,619,570 | 4/1997 | Tsutsui | 380/23 |

*Primary Examiner*—Salvatore Cangialosi
*Attorney, Agent, or Firm*—Limbach & Limbach L.L.P.

[57] ABSTRACT

An information transmitting apparatus for transmitting information regarding the user to an information presenter is constructed of an information reproducing unit for reproducing information; an information input unit for inputting information; a wireless transmitting unit for transmitting the user information corresponding to input information used and inputted by using the information input unit by a radio wave; and an information recording unit for recording information remotely transmitted. The information recording unit has a recording medium in which the information transmitted from the outside is recorded. The information reproducing unit reproduces the information recorded in the information recording unit.

35 Claims, 13 Drawing Sheets

USER INFORMATION TRANSMITTING APPARATUS

INFORMATION TRANSMITTING APPARATUS AND INFORMATION TRANSMITTING SYSTEM

BACKGROUND OF THE INVENTION

1. Field of the Invention

The present invention relates to a system for rapidly and smoothly performing the ordering of an advertised article, the collection of responses of viewers and audiences (hereinafter, simply called viewers collectively) for information provided by a person who provides the information (hereinafter, referred to as an information presenter), and the like.

2. Description of the Prior Art

An apparatus for collecting responses of viewers for information provided to the viewers by an information presenter has been proposed in the specification and drawings of U.S. patent application Ser. No. 08/131,943 filed on Oct. 8, 1993, now U.S. Pat. No. 5,619,570 by the same applicant as that of the present invention. According to the above invention, programs such as music, quiz, and the like are transferred from an information providing terminal to an information recording and reproducing apparatus having therein a recording medium constructed by an IC memory or the like. When the viewer reproduces those programs, selection information inputted by the viewer is recorded to the recording medium. Such information is transferred from the information recording and reproducing apparatus to the information providing terminal. The presenter of the programs can obtain information regarding the response of the viewer. Therefore, the presenter of the programs can easily grasp an information using state, a taste, and the like of the viewer.

An information providing collecting apparatus which has been proposed in U.S. patent application Ser. No. 08/131,943 filed on Oct. 8, 1993, now U.S. Pat. No. 5,619,570 will now be described with reference to the drawings.

FIG. 1 shows an external view of an information recording and reproducing apparatus 160 which has been described in the specification and drawings of the foregoing Patent Application filed by the same applicant as that of the present invention. An information providing collecting apparatus coupling terminal 101 is provided for the information recording and reproducing apparatus 160. Information is copied through such a coupling terminal 101 from an information providing collecting apparatus to a recording medium provided in the information recording and reproducing apparatus 160. The information recording and reproducing apparatus 160 also has an information providing collecting apparatus coupling terminal 102. The information is transferred from the recording medium built in the information recording and reproducing apparatus 160 to the information providing collecting apparatus.

The information recording and reproducing apparatus 160 also has at the front surface: display means 103 constructed of a liquid crystal display or the like; and reproduction selecting means 104 constructed by a plurality of buttons. The display means 103 can display the contents of information recorded on the recording medium in the information recording and reproducing apparatus 160. On the basis of the display of the display means 103, the user of the information recording and reproducing apparatus 160 can selectively reproduce necessary information or input other selection information by using the reproduction selecting means 104.

For example, in the case where a reproduction signal which is reproduced from the recording medium in accordance with the selection information is text information or video information, the text information or video information is displayed by the display means 103. In the case where the reproduction signal from the recording medium is audio information, such audio information is outputted by an earphone 105 provided for the information recording and reproducing apparatus 160. The recording medium built in the information recording and reproducing apparatus 160 is constructed by an IC memory or the like.

FIG. 2 shows an external view of another information recording and reproducing apparatus 190 which has been described in the foregoing specification and drawings. FIG. 2 shows an embodiment in which the information recording and reproducing apparatus 160 in FIG. 1 is constructed in a state in which it is physically separated into an information recording apparatus 110 and an information reproducing apparatus 111. In this case, when information is reproduced, since it is necessary to transmit and receive data and perform a control between the information recording apparatus 110 and information reproducing apparatus 111, an information reproducing apparatus coupling terminal 112 is provided for each of the information recording apparatus 110 and information reproducing apparatus 111 (not shown) as a terminal for coupling both of them.

FIG. 3 shows an external view of an information providing collecting apparatus 140 which has been described in the foregoing specification and drawings. The information providing collecting apparatus 140 has therein a recording medium. Information has been recorded on the recording medium. Wired transfer means 120 is connected to the information providing collecting apparatus 140. Information is transferred from another apparatus to the information providing collecting apparatus 140 through the transfer means 120 and the information recorded on the recording medium in the information providing collecting apparatus 140 is transmitted through such transfer means 120 to another apparatus.

The information providing collecting apparatus 140 shown in FIG. 3 has display means 121 for displaying the contents of information recorded in a recording medium (not shown) or the like and selecting means 122 for selecting which information is outputted from the information providing collecting apparatus 140. A person who wants to obtain the information (hereinafter, simply referred to as an information receiver) can select desired information by the operation of the selecting means 122. The information providing collecting apparatus 140 further has an insertion/ejection port 123 to insert the information recording and reproducing apparatus 160 or information recording apparatus 110. The information recording and reproducing apparatus 160 or information recording apparatus 110 which is owned by the information receiver is inserted into the insertion/ejection port 123, the information providing collecting apparatus coupling terminal 101 of the information recording and reproducing apparatus 160 or information recording apparatus 110 is connected to a coupling terminal (not shown) of the information providing collecting apparatus 140, and the information from the information recording and reproducing apparatus 160 or information recording apparatus 110 is transferred to the information providing collecting apparatus 140, thereby realizing a collection of the information. That is, the information recorded on the recording medium in the information recording and reproducing apparatus 160 or information recording apparatus 110 is copied to the recording medium in the information providing collecting apparatus 140 for a period of time during which the information recording and reproducing apparatus 160 or information recording apparatus 110 is inserted to the information providing collecting apparatus 140 and is ejected therefrom. Therefore, the information is rapidly and easily collected to the information providing collecting apparatus 140. The recording medium built in the information providing collecting apparatus 140 is constructed of an IC memory.

FIG. 4 shows an external view of another information providing collecting apparatus 200 described and shown in the foregoing specification and drawings. In a system of the embodiment, an insertion port 130 and an ejection port 131 which are separated away from each other are provided. In the system, there is provided a belt (not shown) to convey an information recording and reproducing apparatus or information recording apparatus 132 inserted from the insertion port 130 by the user to the ejection port 131. The information recording and reproducing apparatus or information recording apparatus 132 passes in the information providing collecting apparatus 200 and is ejected out to the ejection port 131 by the operation of the belt. Therefore, the information receiver can obtain and transmit the information while walking. Such a system of the embodiment is convenient to rapidly provide and collect information to/from many persons.

FIG. 5 is a block diagram of the information providing collecting apparatus 140 explained and shown in the foregoing specification and drawings. In FIG. 5, the information providing collecting apparatus 140 comprises: control means 144; and recording media 143 and 153, selecting means 148, and display means 146 which are connected to the control means 144. The control means 144 controls output means 156 connected to the recording medium 143. Further, transfer means 155 is connected to the control means 144 and transfer means 141 is connected to the recording medium 143.

FIG. 6 is a block diagram of the information recording and reproducing apparatus 160 described and shown in the specification and drawings. In FIG. 6, the information recording and reproducing apparatus 160 comprises: control means 161; recording means 162 and 172, selecting means 166, and display means 164 which are connected to the control means 161; and reproducing means 170 connected to the recording medium 162. The control means 161 controls receiving means 173 connected to the recording medium 162. The control means 144 of the information providing collecting apparatus 140 is connected to the control means 161 of the information recording and reproducing apparatus 160 in order to communicate with the information recording and reproducing apparatus 160. Further, the output means 156 connected to the recording medium 143 of the information providing collecting apparatus 140 is connected to the receiving means 173 of the recording medium 162 of the information recording and reproducing apparatus 160 in order to transmit the information to the information recording and reproducing apparatus 160.

The operation will now be described hereinbelow. First, information 142 transmitted by the transfer means 141 in a wired or wireless method or the like is supplied to the information providing collecting apparatus 140. The transfer information 142 is recorded onto the recording medium 143. After that, information 145 indicative of the contents of the transfer information 142 or the like is read out from the recording medium 143 by the control means 144. The read-out information 145 is transmitted as display information 147 to the display means 146 by the control means 144 and the display information 147 is displayed. The information receiver inputs a signal indicating which information is obtained through the selecting means 148 with reference to the display information 147 displayed on the display means 146. The selecting means 148 transmits a selection signal 149 corresponding to the information inputted by the information receiver to the control means 144. On the basis of a communication 150 with the control means 161 of the information recording and reproducing apparatus 160 shown in FIG. 6, the control means 144 to which the selection signal 149 was supplied transmits a control signal 151 indicating whether the information is outputted or not to the recording medium 143 in order to copy the information to the information recording and reproducing apparatus 160. The communication 150 will be described in detail hereinafter. The recording medium 143 to which the control signal 151 was supplied transfers information 152 corresponding to the control signal 151 to the output means 156 on the basis of the control signal 151. The control means 144 controls the output means 156 so as to transmit the information 152 to the information recording and reproducing apparatus 160.

An example of the foregoing communication 150 between the control means 144 and the control means 161 will now be described hereinbelow. The control means 161 stores a value of correct information indicating that the information recording and reproducing apparatus 160 can receive the copy from the information provided by collecting apparatus 140, for example, a residual degree D of the recording medium 162. On the other hand, the control means 144 transmits a value which is subtracted from D in the case where the information which the information receiver had wanted to copy was copied, for example, a necessary degree d of the desired information to the control means 161.

The control means 161 compares the residual degree D with the necessary degree d transmitted from the control means 144. In this instance, when $D \geqq d$, the control means 161 transmits a signal to request the copy of the desired information to the control means 144 by the communication 150 and also stores the value obtained by subtracting d from D as a value of a new residual degree D. When $D<d$, the control means 161 transmits a signal indicating that there is no need to copy the desired information to the control means 144 by the communication 150.

At the same time with the transmission of the foregoing information 152, or before or after that, the information providing collecting apparatus 140 receives information indicating how many times the information recorded on the recording medium 143 was reproduced by the information recording and reproducing apparatus 160 from the information recording and reproducing apparatus 160 through the communication 150 and records such information to the recording medium 143. The control means 144 reads out the information stored in the recording medium 143, for example, at every predetermined time and transmits as information 154 to the transfer means 155. The control means 144 can also execute a statistical process or the like to the information 154 as necessary.

In this instance, the block diagram of the information recording and reproducing apparatus shown in FIG. 6 and described in the foregoing will now be further explained. The control means 161 of the information recording and reproducing apparatus 160 receives the information 152 supplied from the information providing collecting apparatus 140 and controls the receiving means 173 so as to transfer the received information 152 to the recording means 162. The information 152 is recorded to the recording means 162. After that, the control means 161 reads out information 163 indicative of the contents of the information 152 supplied from the information providing collecting apparatus

140 or the like from the recording means 162 on the basis of a selection signal 167 indicative of a request of a person who wants to reproduce information (hereinafter, simply referred to as an information reproducer) from the selecting means 166. The information 163 indicative of the contents of the read-out information 152 or the like is transmitted to the display means 164 as display information 165 and the display information 165 is displayed.

The information reproducer selects which information is reproduced by using the selecting means 166 with reference to the display information 165 displayed on the display means 164. The selecting means 166 transmits the selection signal 167 indicative of the information selected by the information reproducer to the control means 161. The control means 161 transmits a control signal 168 corresponding to the selection signal 167 to the recording means 162 on the basis of the selection signal 167. The recording means 162 outputs information 169 corresponding to the control signal 168 to the reproducing means 170 on the basis of the control signal 168. The control means 161 controls the reproducing means 170 so as to reproduce the information 169. The reproducing means 170 supplies reproduced information 174 to the display means 164. The display means 164 displays the information 174. The control means 161 also records the information 171 corresponding to the selection signal 167 from the selecting means 166 to the recording medium 172. That is, the control means 161 records the information indicating how many times the information was reproduced as information 171 to the recording medium 172. When the information recording and reproducing apparatus 160 is subsequently connected to the information providing collecting apparatus 140, the information 171 recorded on the recording medium 172 is transmitted to the information providing collecting apparatus 140 through the control means 161. Therefore, the information recording and reproducing apparatus 160 can store the information indicating how many times the information recorded on the recording medium 143 was reproduced. Further, as mentioned above, the information providing collecting apparatus 140 can collect such information from the information recording and reproducing apparatus 160 and can obtain the information regarding an information reproduction using situation of the user of the information recording and reproducing apparatus 160.

Although the apparatus in which the information recording means and the information reproducing means are integrated as shown in FIG. 1 has been explained as mention above, it is also possible to give a similar function to the apparatus in which the information recording means and the information reproducing means are separated as shown in FIG. 2.

In the case where the foregoing apparatus is applied to an advertising and order receiving system for providing advertisement information from the information providing terminal to the viewer and for obtaining order information from the viewer, the following problem occurs.

First, with reference to the reproduced information, the order information inputted by the viewer is recorded to the recording medium. After that, when the viewer subsequently connects the information recording and reproducing apparatus to the information providing terminal, since the order information is collected to the information recording and reproducing apparatus for the first time, a person who receives the order (hereinafter, simply referred to as an order acceptor) cannot rapidly accept the order from the viewer. Particularly, in a system such that the advertisement information of the articles is transmitted as information to be sent from the information providing apparatus to the information recording and reproducing apparatus and the order information is transmitted from the information recording and reproducing apparatus to the information providing collecting apparatus, when a person who orders (hereinafter, simply referred to as an order sender) (viewer) subsequently connects the information recording apparatus to the information providing terminal, since the information regarding a response of the order sender is collected, there is a drawback such that the order information doesn't reach its destination soon. For example, in the case where the advertisement information is event opening information and the order information is reservation information or the like, since the reservation information cannot be promptly collected, such a drawback becomes an especially serious problem. Second, since the system in the embodiment doesn't have a function to authorize the order sender, for example, in the case where the information recording and reproducing apparatus is stolen or lent to another person, there is a fear that ordering will occur due to spite mischief or the like.

OBJECTS AND SUMMARY OF THE INVENTION

It is, therefore, a first object of the invention to provide information transmitting apparatus and information collecting system which can promptly perform the ordering by providing an information transmitting function by using a wireless manner or the like for the information transmitting apparatus.

A second object of the invention is to provide information transmitting apparatus and information collecting system such that even when an information recording and reproducing apparatus is given to a third party, an incorrect ordering is not performed by providing a function to authorize an order sender for the information transmitting apparatus.

The first object of the invention is accomplished by an apparatus for transmitting information regarding the user to an information presenter, comprising: means for reproducing information; means for inputting information; and means for transmitting user information corresponding to the information from the input means by a wireless manner in order to respond to the information reproduced by the reproducing means.

The first object of the invention is also accomplished by an information collecting system for collecting information regarding the user to an information presenter, comprising: at least one information transmitting apparatus having means for reproducing information, means for inputting information, and means for transmitting user information corresponding to the information from the input means by a wireless manner in order to respond to the information reproduced by the reproducing means; and at least one information collecting apparatus having means for receiving the user information from the wireless transmitting means.

The second object of the invention is accomplished by an information transmitting apparatus for transmitting information regarding the user to an information presenter, comprising: means for reproducing information; means for inputting information; means for authorizing the user by using a personal identification number from the input means; and means for transmitting user information corresponding to the information from the input means in order to respond to the information reproduced by the reproducing means.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described with reference to the drawings. In the description of the embodiments of the invention, the operation of a user information transmitting apparatus of the invention corresponds to the operation of the information recording and reproducing apparatus in the above explanation so far, and the operation of a user information collecting apparatus corresponds to the operation of the information providing collecting apparatus in the above description so far. In the following explanation, descriptions regarding portions whose contents are overlapped to those of the portions in the above description are omitted to avoid a complexity.

Figure 7:
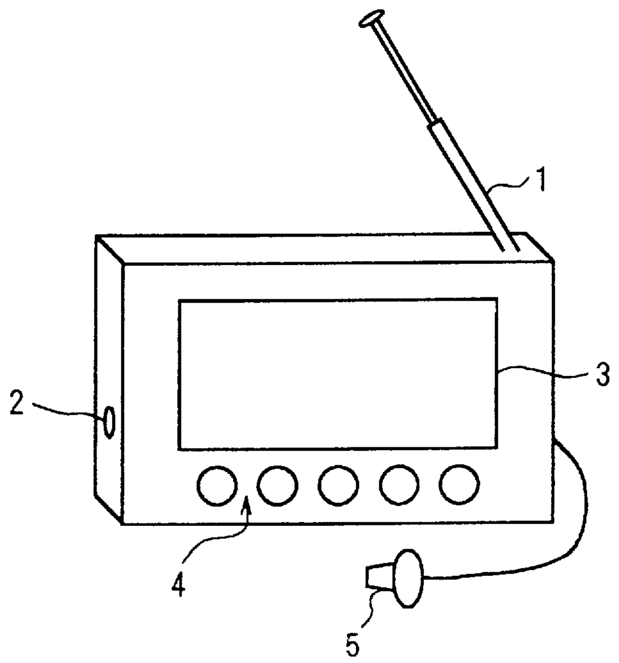
FIG. 7 is an external view showing an embodiment of a user information transmitting apparatus according to the invention.

FIG. 7 shows an external view of the user information transmitting apparatus having an information transmitting function in the invention. FIG. 7 shows an embodiment of the user information transmitting apparatus in the invention which corresponds to the above-mentioned information recording and reproducing apparatus shown in FIG. 1. An antenna 1 is provided for the user information transmitting apparatus. User information such as order information or the like is transmitted through the antenna 1. The user information transmitting apparatus has an information collecting apparatus coupling terminal 2 and can perform a transmission/reception of information to/from a user information collecting apparatus using the information collecting apparatus coupling terminal 2.

The user information transmitting apparatus further has display means 3 constructed by a liquid crystal display or the like and reproduction selecting means 4 constructed by a plurality of buttons. The display means 3 can display information recorded on a recording medium in the user information transmitting apparatus. On the basis of the display of the display means 3, for example, the user of the user information transmitting apparatus can selectively reproduce necessary information from the recording medium by using the reproduction selecting means 4 and can input other selection information. The contents of the signal reproduced from the recording medium include text information, audio information, video information, computer program, and the like and are not particularly limited. In this instance, the reproduction of the program denotes the execution of the program.

For example, in the case where a reproduction signal reproduced from the recording medium in accordance with the selection information is text information or video information, the text information or video information is displayed to the display means 3. In the case where the reproduction signal reproduced from the recording medium is audio information, the audio information is supplied to an earphone 5 provided for the user information transmitting apparatus. The audio information can be also supplied to a speaker (not shown in FIG. 7) in place of or in addition to the earphone 5. Further, the user information transmitting apparatus is connected to an external CRT (Cathode Ray Tube), speaker, or the like (not shown in FIG. 7) through an external terminal (not shown) provided for the user information transmitting apparatus and the reproduction signal can be also reproduced by the external CRT, speaker, or the like. Although the kind of recording medium built in the information transmitting apparatus is not specifically limited, it is convenient to use an. IC memory in which data can be copied at a high speed and which can be easily accessed at random and which is excellent in portability.

Figure 2:
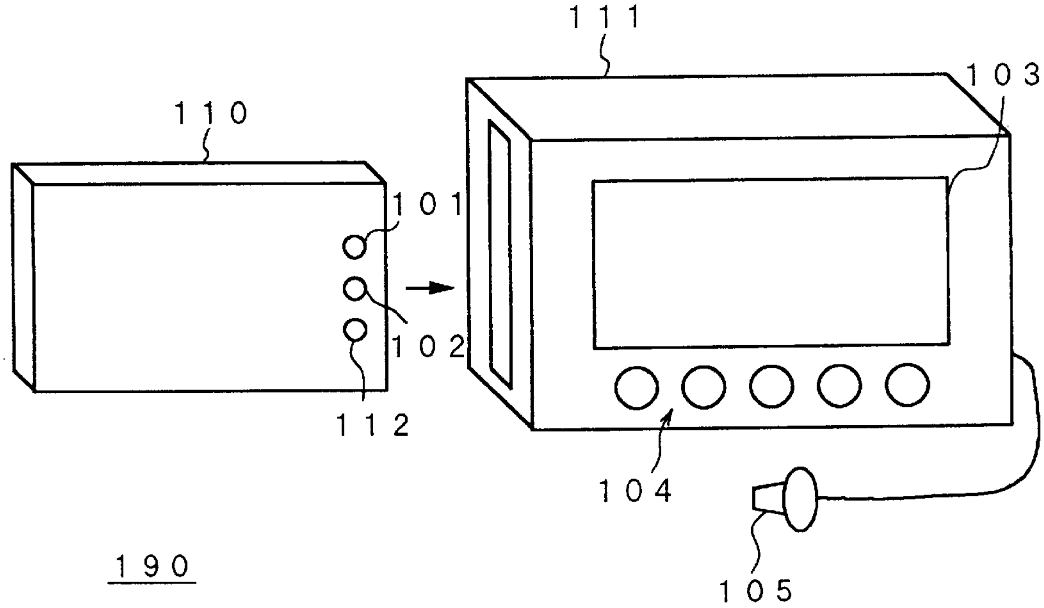
FIG. 2 is an external view showing an embodiment of an information recording apparatus and an information reproducing apparatus according to the invention.
Figure 3:
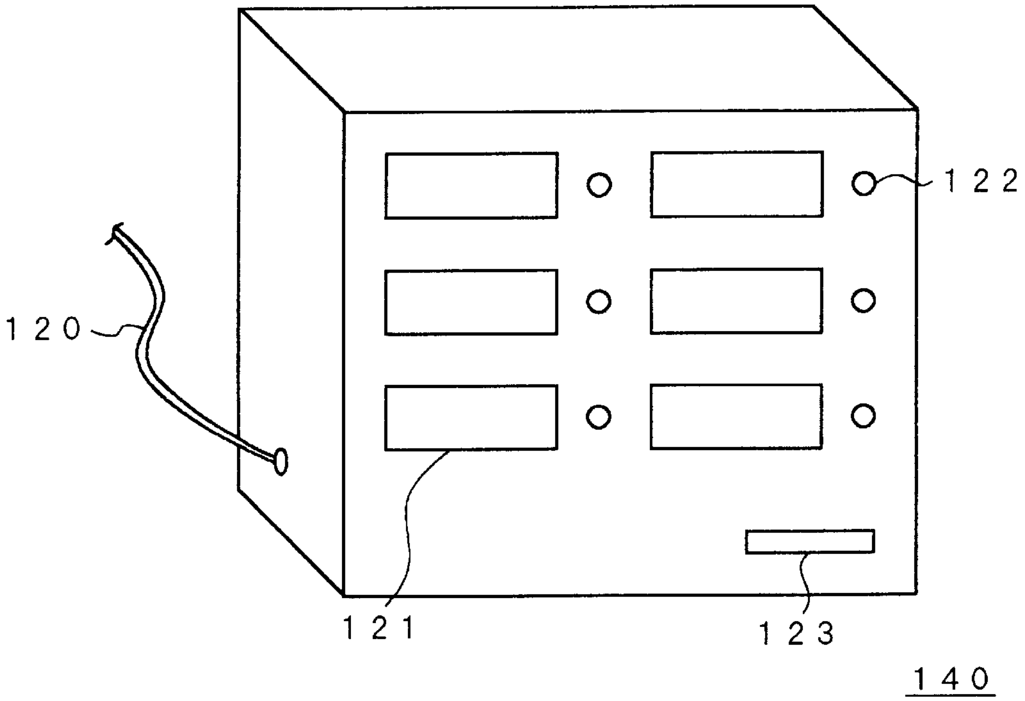
FIG. 3 is an external view showing an embodiment of an information providing collecting apparatus according to the invention.
Figure 4:
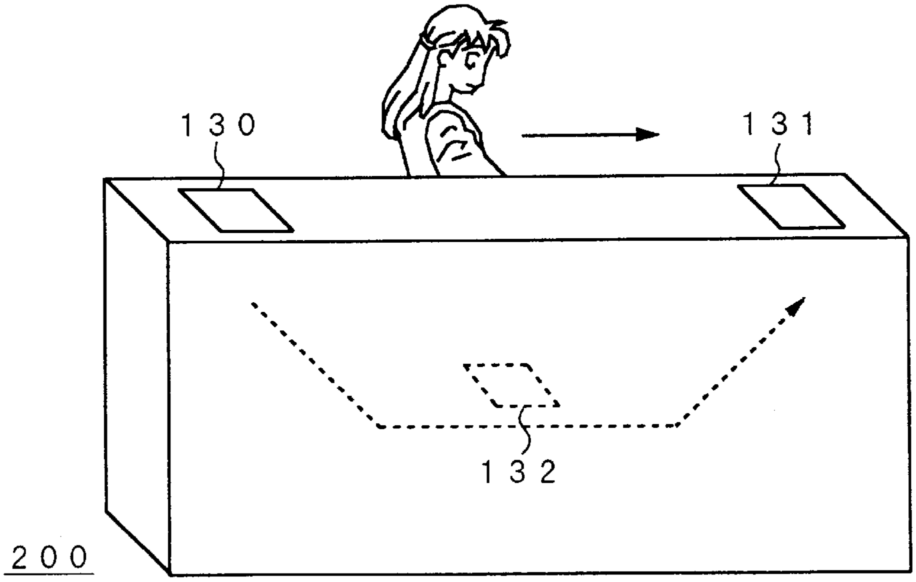
FIG. 4 is an external view showing another embodiment of the information providing collecting apparatus according to the invention.
Figure 5:
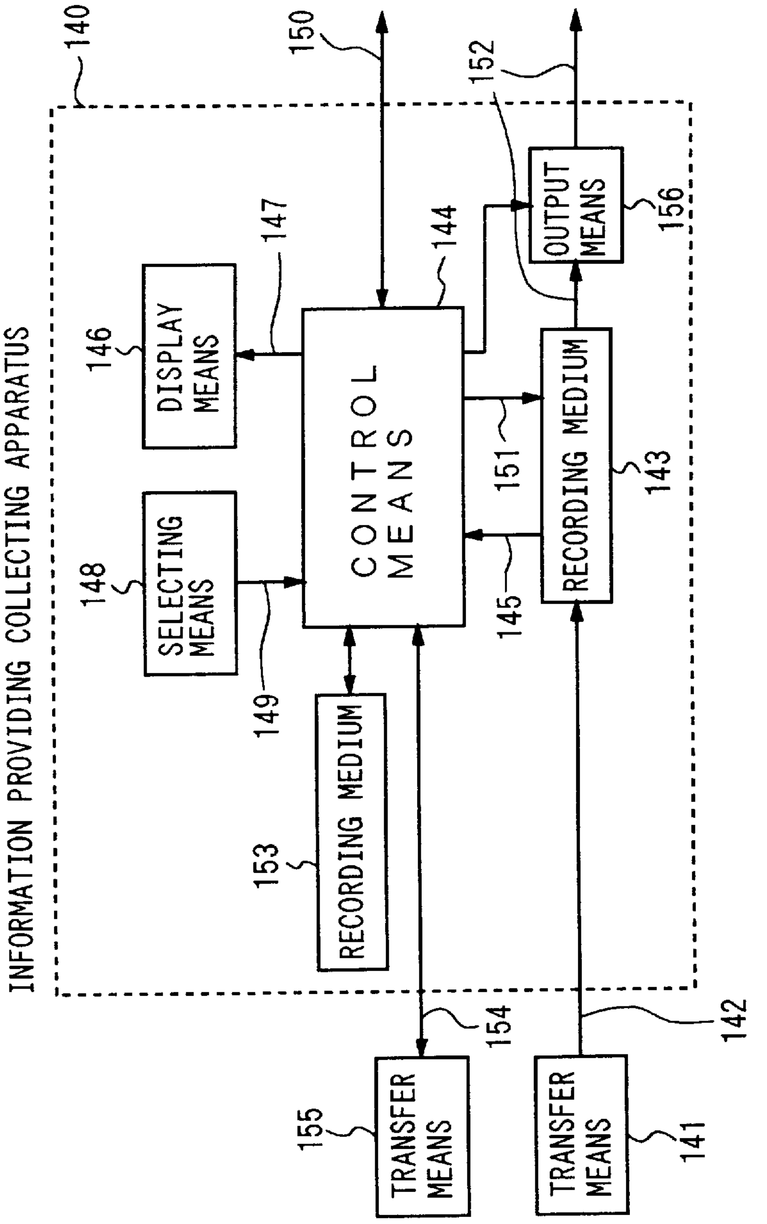
FIG. 5 is a block diagram showing an embodiment of the information providing collecting apparatus according to the invention.
Figure 8:
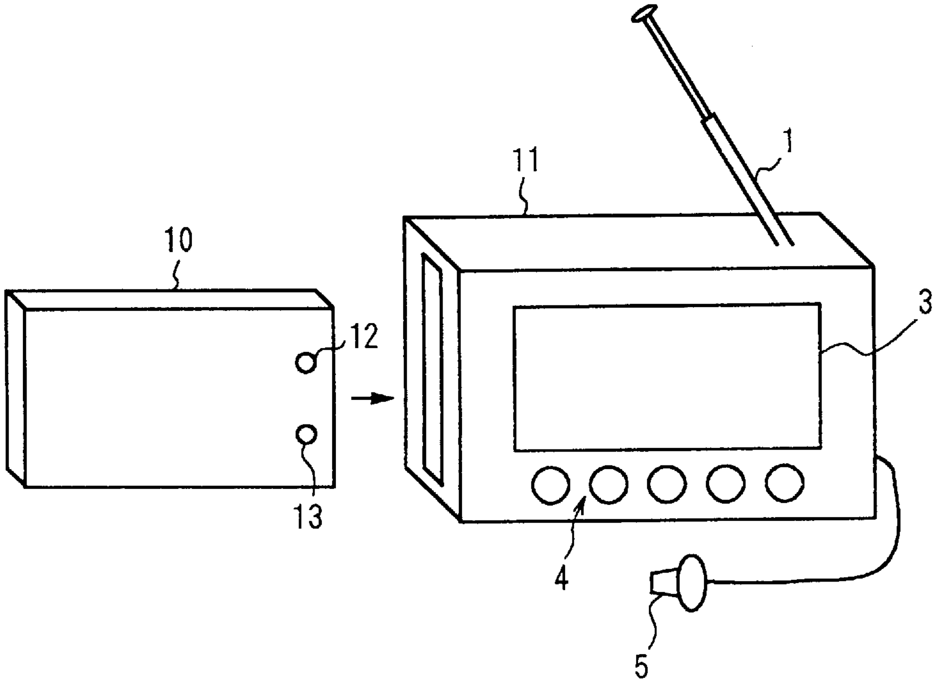
FIG. 8 is an external view showing another embodiment of the user information transmitting apparatus according to the invention.

A user information transmitting apparatus shown in FIG. 8 relates to an example in which the user information transmitting apparatus in FIG. 7 is constructed in a state in which it is physically separated into an information recording apparatus 10 and an information reproducing apparatus 11. FIG. 8 shows an embodiment of the user information transmitting apparatus of the invention which corresponds to the above-mentioned information recording apparatus and information reproducing apparatus shown in FIG. 2. In the apparatus separated into the information recording apparatus and the information reproducing apparatus, when information is reproduced, since it is necessary to transmit and receive data and perform a control between the information recording apparatus 10 and information reproducing apparatus 11, an information reproducing apparatus coupling terminal 13 is provided for each of the information recording apparatus 10 and information reproducing apparatus 11 as a terminal for coupling both of them. The user information transmitting apparatus has an information collecting apparatus coupling terminal 12 and transmits or receives information to/from an information collecting apparatus by using the information collecting apparatus coupling terminal 12. As for the information collecting apparatus coupling terminal 12 and information reproducing apparatus coupling terminal 13, they can be also constructed so that one terminal is actually switched and used. The user information transmitting apparatus also has the antenna 1 similar to that of the user information transmitting apparatus shown in FIG. 7. The user information such as order information or the like is transmitted through the antenna 1. The information recording and reproducing apparatus is constructed by an IC card having therein an IC memory.

Figure 1:
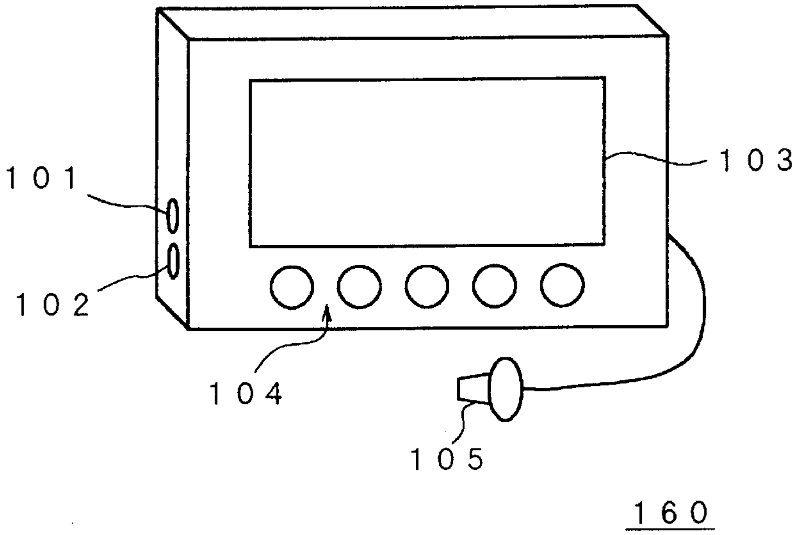
FIG. 1 is an external view showing an embodiment of an information recording and reproducing apparatus according to the invention.
Figure 6:
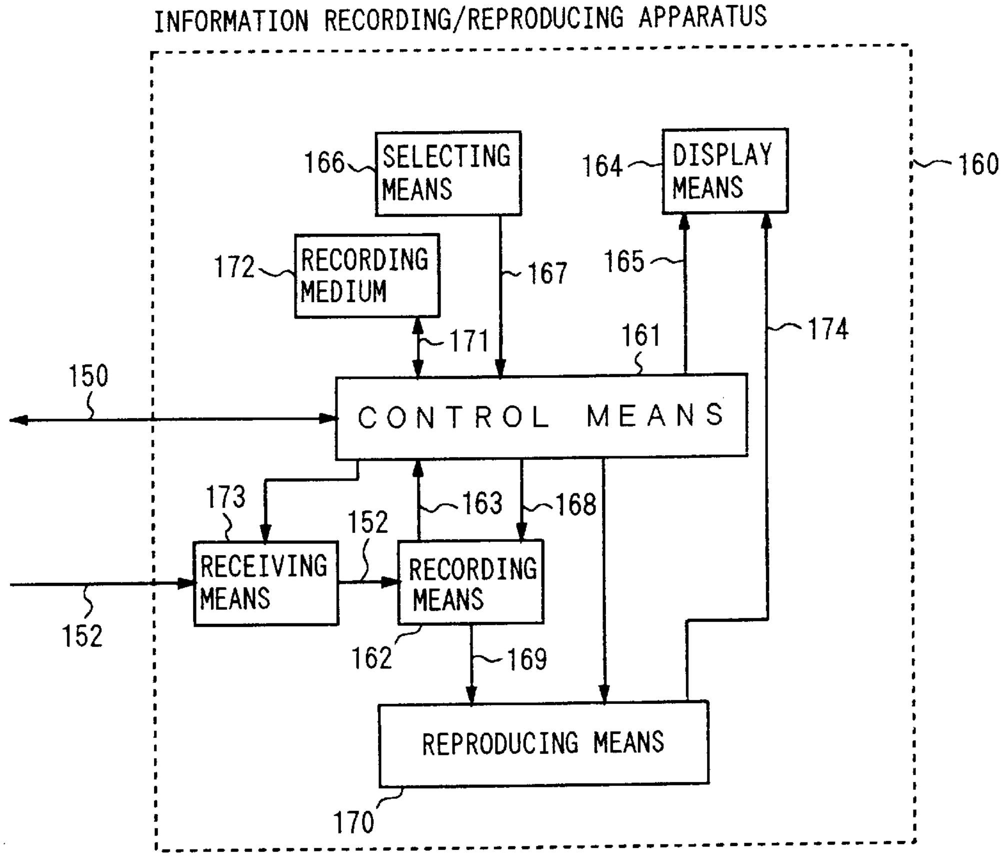
FIG. 6 is a block diagram showing an embodiment of an information recording and reproducing apparatus according to the invention.
Figure 9:
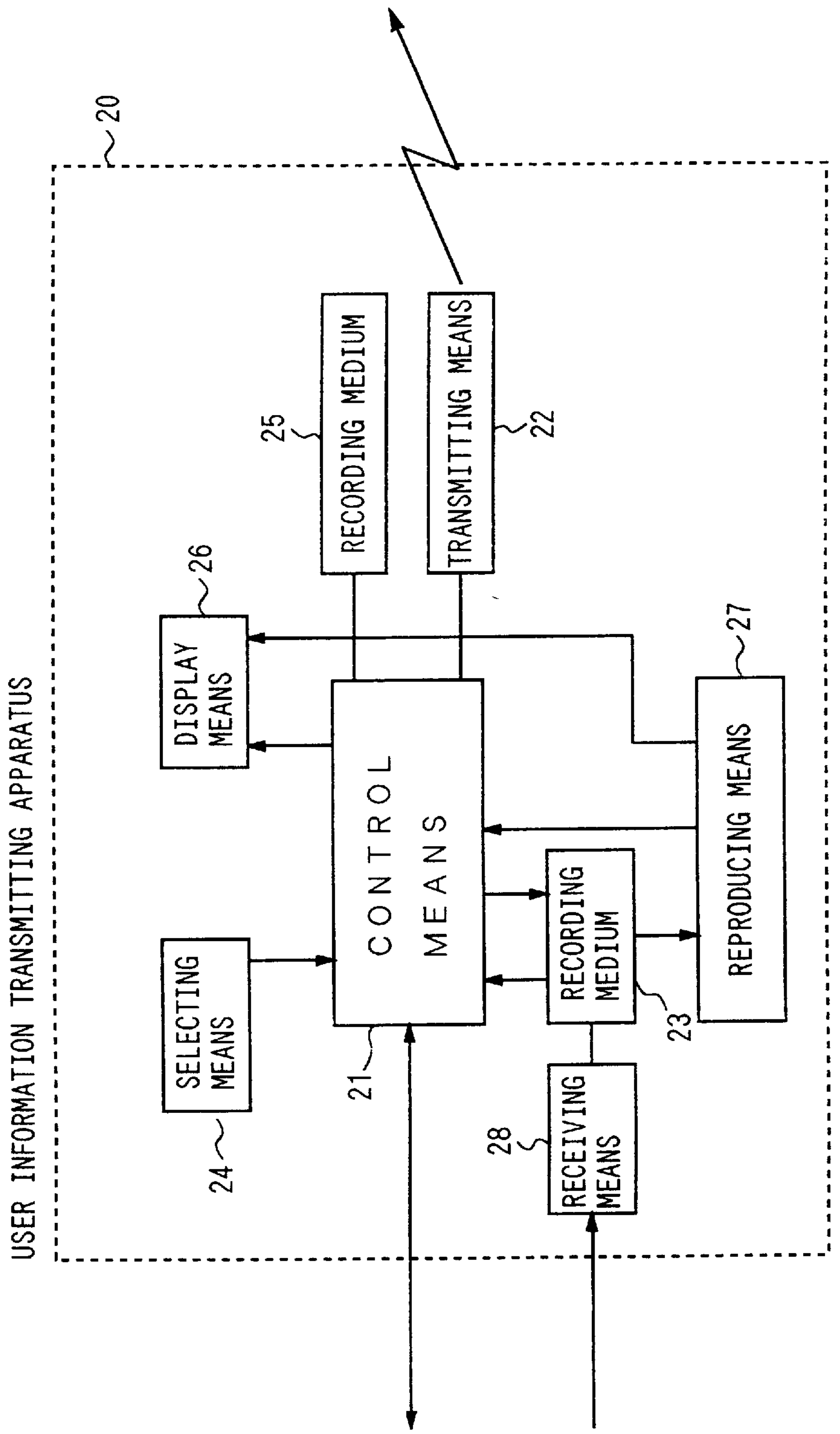
FIG. 9 is a block diagram showing an embodiment of the user information transmitting apparatus according to the invention.

FIG. 9 shows a block diagram of the user information transmitting apparatus shown in FIG. 1. A function of a user information transmitting apparatus 20 shown in FIG. 9 is obtained by extending the function of the information recording and reproducing apparatus 160 shown in FIG. 6. That is, the function, which will be described hereinbelow, is added to control means 21. Further, transmitting means 22 is connected to the control means 21. The control means 21 in FIG. 9 controls reproducing means 27 so as to reproduce information recorded on a recording medium 23, executes a process of order information of the user, and supplies the processed information to the transmitting means 22. The transmitting means 22 outputs the supplied information.

The operation will now be described hereinbelow.

The control means 21 of the user information transmitting apparatus 20 receives advertisement information provided and controls receiving means 28 so as to transfer the received advertisement information to the recording medium 23. The advertisement information is recorded onto the recording medium 23. After that, the control means 21 reads out information indicative of the contents of the provided advertisement information or the like from the recording medium 23 on the basis of a selection signal from selecting means 24 indicative of a request of the information reproducer. The information indicative of the contents of the read-out advertisement information or the like is transmitted as display information to display means 26, thereby displaying the display information.

The information reproducer selects which advertisement information is reproduced by using the selecting means 24 with reference to the display information displayed on the display means 26. The selecting means 24 transmits a selection signal indicative of the advertisement information selected by the information reproducer to the control means 21. The control means 21 transmits a control signal corresponding to the selection signal to the recording medium 23 on the basis of the selection signal. The recording medium 23 outputs the advertisement information corresponding to the control signal to the reproducing means 27 on the basis of the control signal. The control means 21 controls the reproducing means 27 so as to reproduce the advertisement information. The reproducing means 27 supplies the reproduced advertisement information to the display means 26 and the display means 26 displays the advertisement information. After that, the information reproducer selects a desired article by using selecting means 24 with reference to the displayed advertisement information. The control means 21 receives information corresponding to the selected article and generates order information corresponding to the information and, after that, supplies the order information to the transmitting means 22. The transmitting means 22 transmits the supplied order information. The control means 22 further supplies information regarding the order information to the recording medium 25 and the recording medium 25 records the information.

Figure 10:
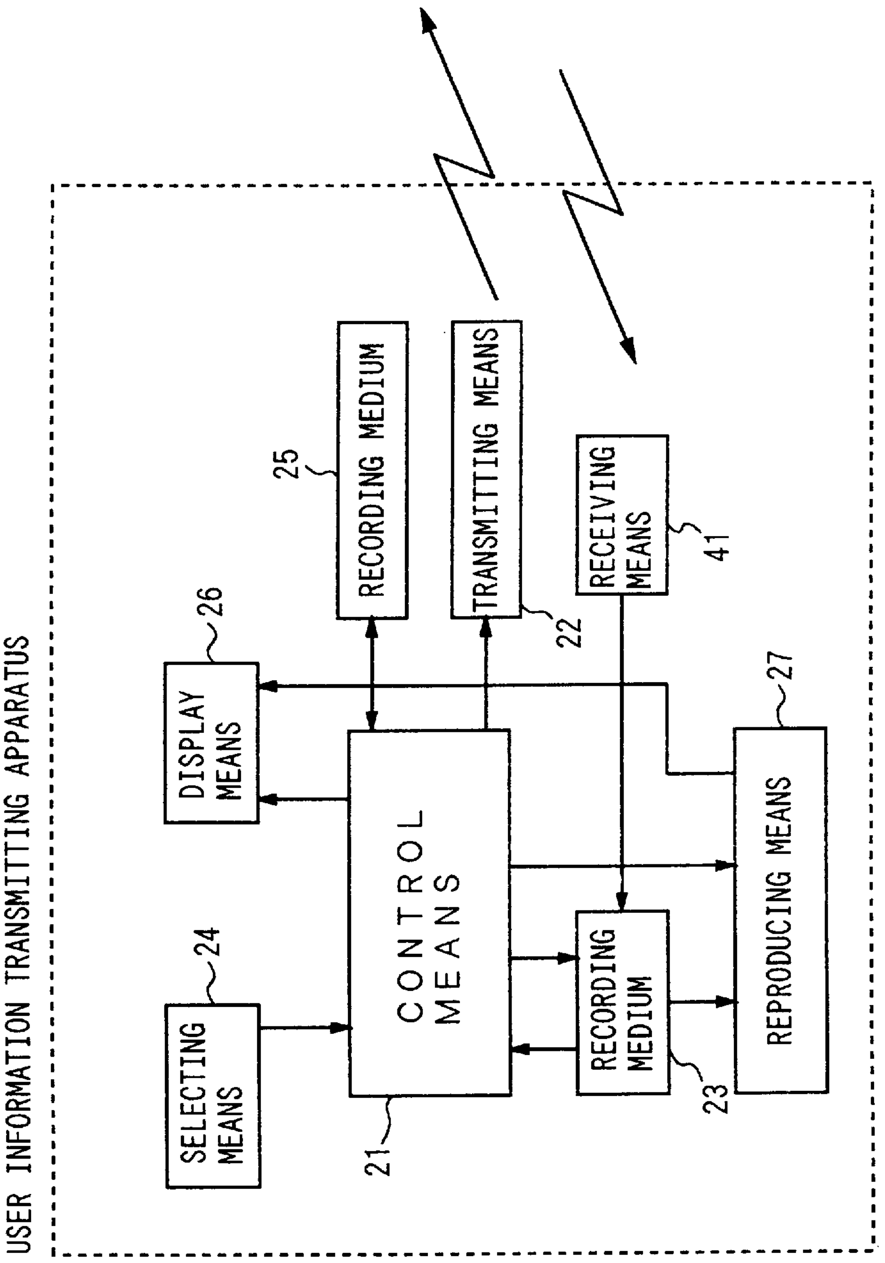
FIG. 10 is a block diagram showing another embodiment of the user information transmitting apparatus according to the invention.

FIG. 10 shows a block diagram in which broadcast receiving means 41 is connected to the recording medium 23 in the user information transmitting apparatus 20 which has been explained in FIG. 9. The broadcast receiving means 41 receives advertisement information transmitted by a broadcast and supplies the received advertisement information to the recording medium 23. The recording medium 23 stores the supplied advertisement information. The control means 21 does not always temporarily store the advertisement information received by the broadcast receiving means 41 into the recording medium 23 but directly supplies the advertisement information to the display means 26 so as to display it. It is also possible that the control means 21 generates order information on the basis of the information corresponding to a desired article based on the display information and supplies the order information to the transmitting means 22 and the transmitting means 22 transmits the order information. However, errors are reduced in the case where the order information is temporarily stored and, after the user was authorized, the order information is generated.

FIGS. 9 and 10 relate to the explanation of the embodiment of the user information transmitting apparatus in which the information recording apparatus and the information reproducing apparatus are integrated. As shown in FIG. 8, however, in the user information transmitting apparatus in which the information recording apparatus 10 and the information reproducing apparatus 11 are separated, upon watching and listening, the information recording apparatus is installed into the information reproducing apparatus or the information recording apparatus is connected to the information reproducing apparatus in a wired or wireless manner, so that the above mentioned processes in the explanation in FIGS. 9 and 10 are executed.

When the information has already been recorded in the information recording apparatus and it is unnecessary to store the information transmitted from the outside, as an information recording apparatus, an un-rewritable type device such as mask ROM (read only memory), read only optical disk, or the like can be also used.

In the embodiments shown in FIGS. 7 and 8, the radio waves transmitted from the antenna 1 have been used as transmitting means of the user information. However, the user information transmitting apparatus can also use infrared rays or the like in order to transmit the user information as means other than the radio waves.

Figure 11:
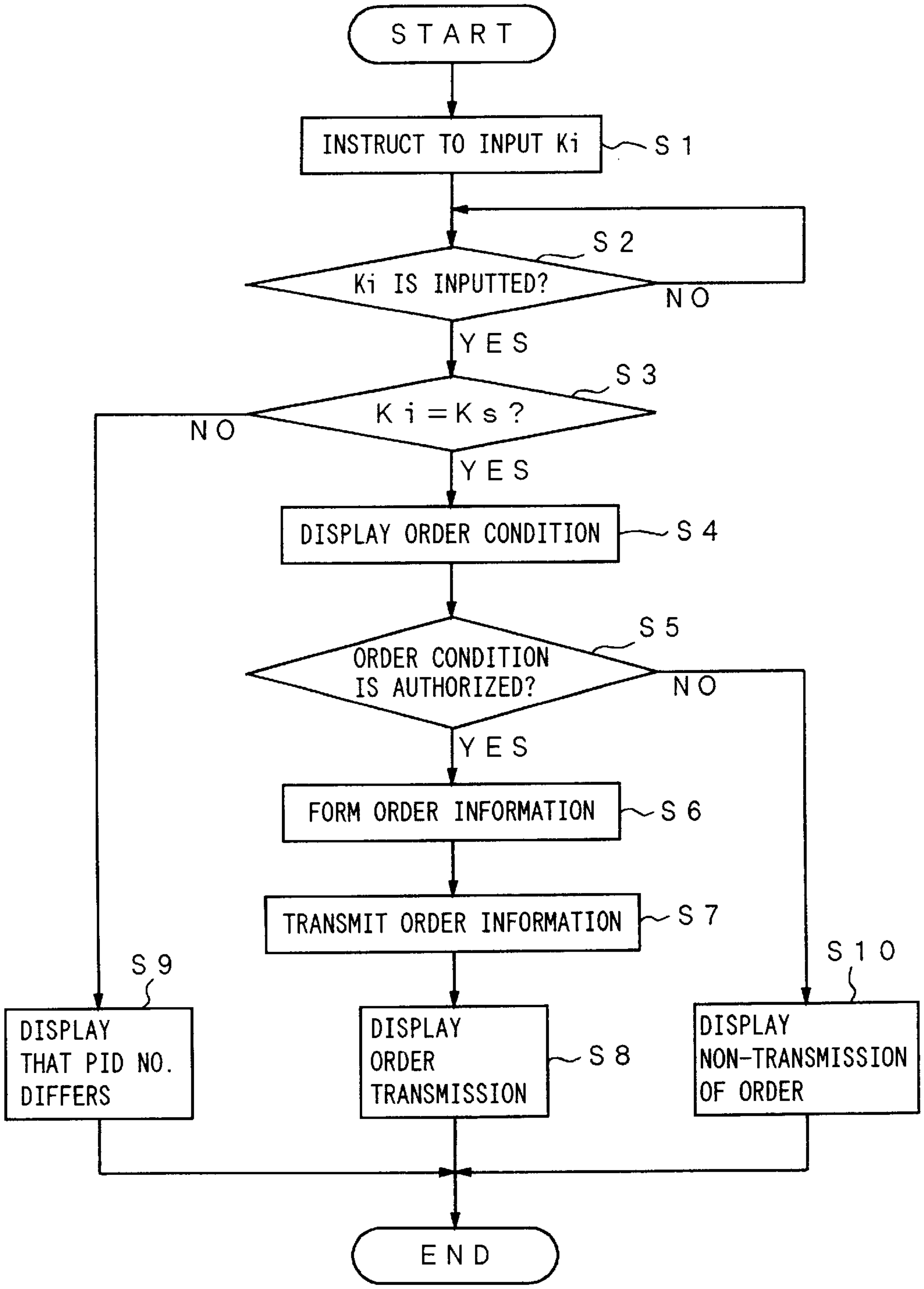
FIG. 11 is a flowchart showing an embodiment of an order information transmitting control process according to the invention.

FIG. 11 shows a flowchart for a transmission control process of order information in the control means 21. The advertisement information accumulated in the recording medium 23 is supplied to the display means 26 by the reproducing means 21 and is confirmed by the user (viewer) of the user information transmitting apparatus 20. A desired article is inputted by the selecting means 24. After that, the transmission control process of FIG. 11 is executed.

Step S1 relates to a process for instructing the user to input a personal identification number. In step S1, in order to display display information for instructing the user to input information Ki corresponding to the personal ID number of the user, the control means 21 outputs the display information to the display means 26. In step S2, a check is made to see if the information Ki has been inputted to the user of the user information transmitting apparatus by the selecting means 24 or not. When Ki is inputted by the user, the control means 21 compares Ki inputted by the user with a personal identification number Ks stored in the recording medium 25. When Ki and Ks are equal, the control means 21 judges that this order was made by the legal user. A process in step S4 is executed. When Ki and Ks are not equal, the control means 21 judges that the order is not performed by the authorized user. In step S9, in order to display display information indicating that the inputted personal ID number is not correct, the control means 21 outputs the display information to the display means 26. The processing routine is finished.

In step S3, when the control means 21 judges that the inputted personal ID number is correct, in order to display order conditions such as a price and the like of the article during the advertisement, the control means 21 outputs the information indicative of the order conditions to the display means 26. A process in step S5 is executed. In step S5, the user decides whether the order conditions are authorized or not. The user inputs information indicative of such a judgment result by using the selecting means 24. If information indicative of the authorization of the order conditions is inputted, the control means 21 executes a process in step S6. If information indicating that the order conditions are not authorized is inputted, the control means 21 executes a process in step S10. In order to display display information indicating that the order is not transmitted, the control means 21 outputs the display information to the display means 26. The processing routine is finished.

After the information indicative of the authorization of the order conditions was inputted, in step S6, the control means 21 forms order information to transmit by the transmitting means by a method, which will be explained hereinlater. In step S7, in order to transmit the formed order information through the transmitting means 22, the control means 21 outputs the order information to the transmitting means 22. The order information is transmitted by the transmitting means 22. The order information includes identification information of the user and ordered article identification information. The ID information of the user is registered by, for example, the user information collecting apparatus on the order destination side and uses the registration number of the user which has previously been stored in the recording medium 25. After the transmitting process of the order information was executed, the control means 21 executes a process in step S8. In order to display display information indicating that the transmission of the order information was executed, the control means 21 outputs the display information to the display means 26. The processing routine is finished.

As mentioned above, according to the invention, after the personal ID number has been inputted and the person who had ordered has been authorized, the order information is transmitted. Therefore, for example, even if the owner has lost the user information transmitting apparatus, a transmission of order information due to spite can be prevented.

Figure 12A:
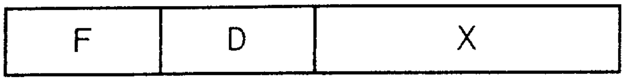
FIGS. 12A and 12B are diagrams each for explaining a construction of an embodiment of order information according to the invention.
Figure 12B:
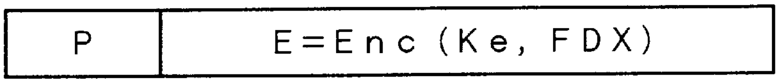

FIGS. 12A and 12B show the contents of the order information to be transmitted. In FIG. 12A, F denotes fixed information as a fixed bit train; D date and time information; and X ordered article identification information. As shown in FIG. 12A, those information is coupled as a bit train FDX. As shown in FIG. 12B, the bit train FDX is enciphered to an enciphered bit train E by key information Ke. A registration number P as ID information of the user is added to the head of the enciphered bit train FDX (bit train H). The bit train H is finally transmitted as order information.

In the embodiment, the information Ki inputted as a personal ID number by the user is used as key information Ke. However, as another example, information constructed by the date information and the personal ID number information Ki can be also used as key information Ke. If the information inputted as key information is information which can be commonly used in both of the user information transmitting apparatus and the user information collecting information, the key information Ke can be also inputted independent of Ki.

Figure 13:
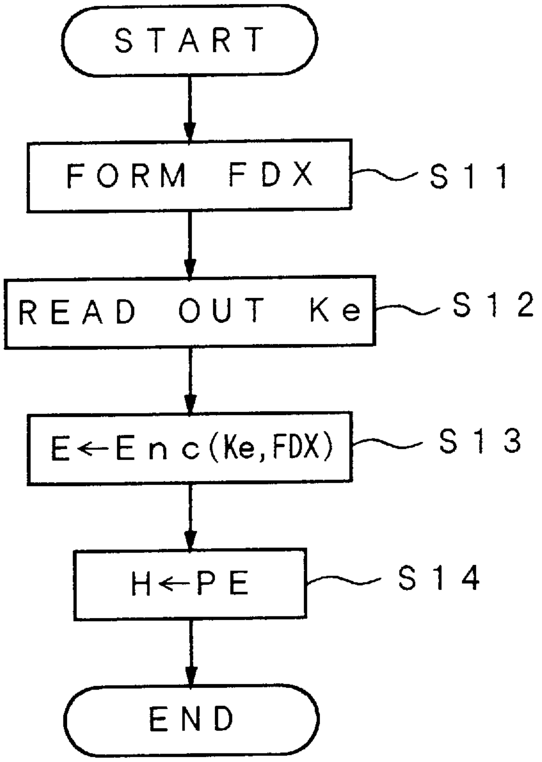
FIG. 13 is a flowchart showing an embodiment of a process for producing the order information according to the invention.

FIG. 13 shows a flowchart for processes of the control means 21 to form the foregoing order information in the user information transmitting apparatus shown in FIG. 9 or 10. In the embodiment of this flowchart, the personal identification number is used as key information Ke. In case of using the personal ID number as key information Ke, when the personal ID number is inputted, it is recorded onto the recording medium 25. In step S11, the control means 21 constructs the bit train FDX as shown in FIG. 12A. In step S12, the personal ID number information Ki that is used as key information Ke is read out from the recording medium 25. Further in step S13, the bit train FDX is enciphered to the enciphered bit train E by using the personal ID number information Ki that is used as key information Ke read out. In step S14, the control means 21 adds the registration number P to the head of the enciphered bit train E, thereby constructing the bit train H. As mentioned above, the bit train H is sent to the transmitting means 22 and transmitted as order information.

According to the invention as mentioned above, the enciphered key information is constructed on the basis of the information inputted when the user transmits the order or the like. Therefore, there is no fear such that the user information transmitting apparatus is analyzed by a malicious third party and the key information is stolen. Safety can be provided.

As another example, the key information Ke can be also formed from the date information and the personal ID number information Ki. In this case, in step S11, the control means 21 forms the key information Ke from the date information and the personal ID number information Ki. The key information Ke can be also inputted independent of the personal ID number. In this case, in step S11, in order to display display information to instruct the user to input the personal ID number, the control means 21 outputs the display information to the display means 26. In response to the display information, the control means 21 detects whether the key information Ke has been inputted or not.

Figure 14:
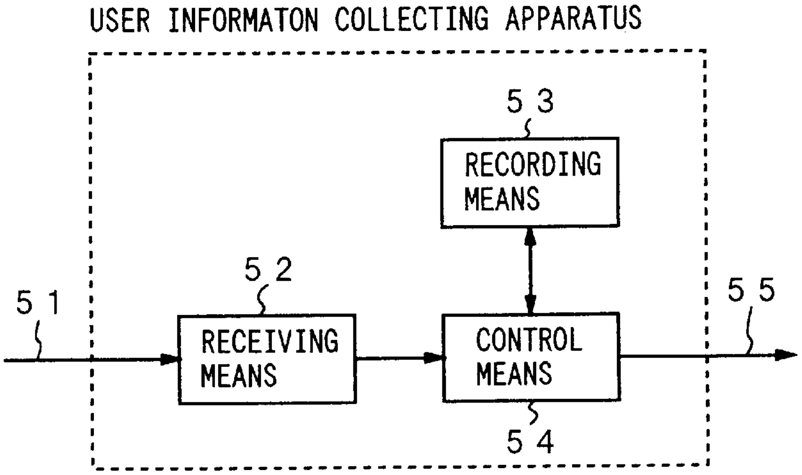
FIG. 14 is a block diagram showing an embodiment of a user information collecting apparatus according to the invention.

FIG. 14 shows a block diagram of a user information transmitting apparatus for collecting the order information transmitted by the user information transmitting apparatus and decoding the order information. The user information collecting apparatus comprises: receiving means 52 for receiving information 51 transmitted; recording means 53 in which the registration number to identify the user and its key information have been stored; and control means 54 to which the receiving means 52 and recording means 53 are connected. The control means 54 executes processes, which will be explained hereinlater, and accepts only the correct order information and outputs order information 55.

Figure 15:
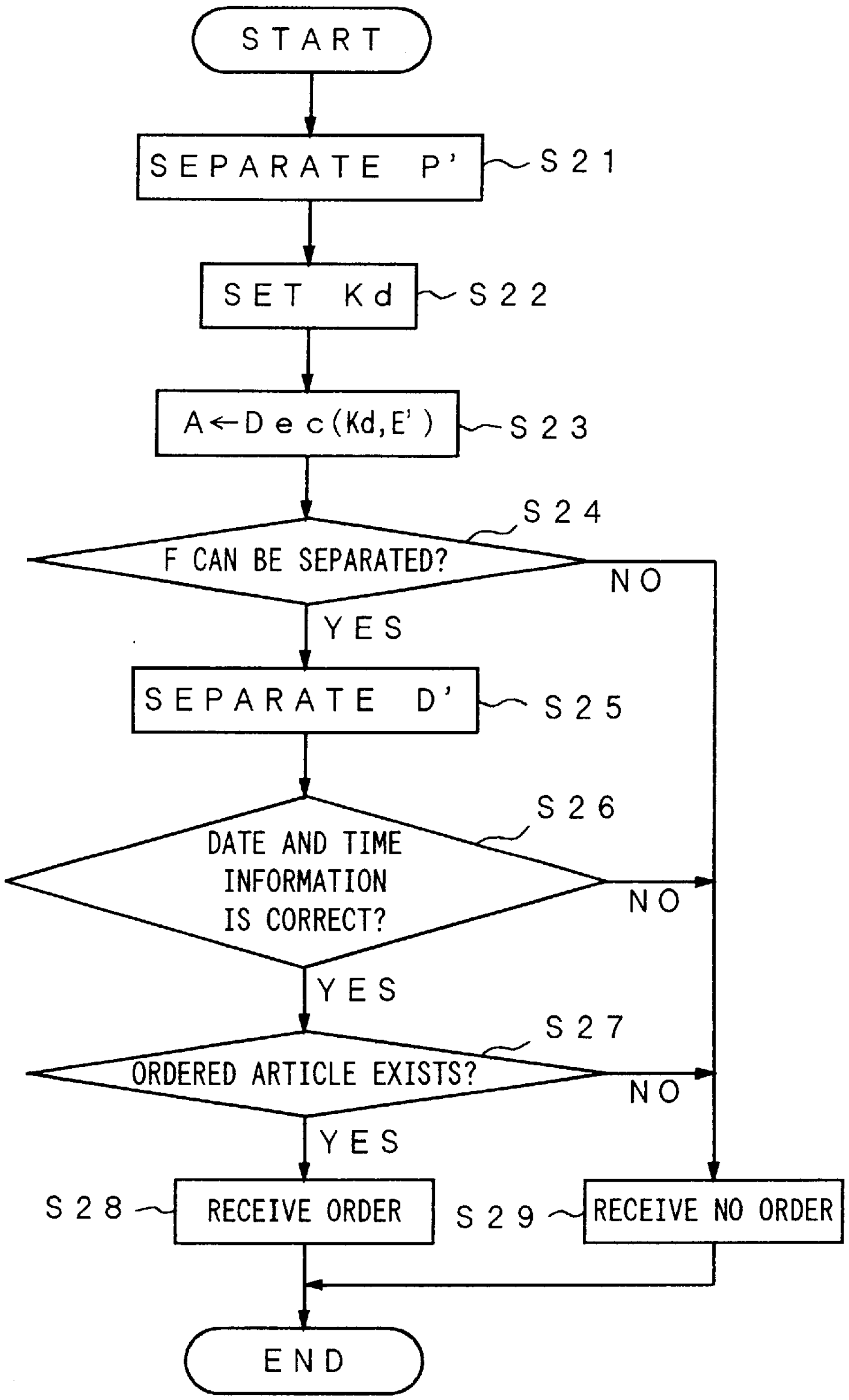
FIG. 15 is a flowchart showing an embodiment of a process for decoding order information according to the invention.

FIG. 15 shows a flowchart for processes of the control means 54 for decoding the received order information in the user information collecting apparatus shown in FIG. 14. In step S21, the control means 54 separates a bit train H' received by the receiving means 52 into a registration number P' and an enciphered bit train E'. In step S22, the control means 54 sets a decoding key Kd corresponding to the registration number P separated in step S21. Namely, the control means 54 searches the decoding key Kd corresponding to the registration number with reference to a decoding key table recorded in the recording means 53. After the decoding key Kd was set, in next step S23, the control means 54 decodes the enciphered bit train E' separated from the above bit train H by the decoding key Kd, thereby obtaining the bit train A.

In step S24, the control means 54 judges whether a bit train of the predetermined fixed information F at the head of the bit train A can be separated or not. If the bit train of the accurate fixed information F is not obtained, the control means 54 judges that the received order information is not legally enciphered. The control means 24 executes a process in step S29 and outputs information indicating that the order information which had actually been received was not accepted. The processing routine is finished. If the bit train of the accurate fixed information F is obtained, the control means 54 judges that the received order information was legally enciphered. A process in step S25 is executed.

In step S25, the control means 54 separates date and time information D' from the remaining bit train separated in step S24. In next step S26, the control means 54 detects whether the separated date and time information D' indicates a legal value or not. When the date and time information D' is deviated to the past from the present date and time information by a time over a predetermined error range, the control means 54 judges that the transmitted information is illegal as in the case where the information which had been transmitted by the legal user in the past was retransmitted or the like. The control means 24 executes a process in step S29 and outputs information indicating that the order information which had actually been received was not accepted. The processing routine is finished.

In step S26, if the date and time information D' lies within the predetermined error range from the present date and time information, in step S27, the control means discriminates whether the remaining bit train in which the fixed information F and date and time information D' were separated from the bit train A in the above steps indicates the article which actually exists or not. If the remaining bit train indicates the article which actually exists, in step S28, the control means 24 accepts this order. On the other hand, in step S27, if the separated remaining bit train doesn't indicate the article which actually exists, in step S29, the control means 24 outputs information indicating that the order information which had actually been received was not accepted. The processing routine is finished.

Since the above series of enciphering methods use the enciphering method whereby the transposition and the character change are complicatedly combined by the key signal, if the key information and all of the bit trains to be enciphered are not obtained, the information cannot be correctly enciphered. Therefore, the foregoing enciphering method whereby the fixed information F, the variable date and time information D, and the ordered article information X are combined as mentioned above can judge whether the information has been transmitted from the legal user having the key information to be correctly enciphered or not. The enciphering method in which the transposition and the character change are complicatedly combined by the key signal has been disclosed in, for example, the literature such as "Data Encryption Standard", National Bureau of Standards, Federal Information Processing Standards Pub., 46, 1977, or the like.

The above system has used the fixed information F as an enciphering method. However, as another enciphering method, for example, it is also possible to use a method whereby the date and time information D and ordered article information X are repeated twice, the resultant information DXDX is enciphered and transmitted, and when the transmitted data is decoded, a check is made to see if the pattern in which those information are repeated twice is correctly decoded or not.

Further, the date and time information D has been enciphered together with the order information in the above system. However, for example, in place of the date and time information D, serial number information of the order for each article of each user can be also enciphered. By using such a method, in the user information collecting apparatus, there is no need to consider an error of the date and time information. By registering the serial numbers, the user information collecting apparatus can recognize the past order information of each user every article.

Further, in the case where the number of ordering times of each article for each user has been determined to be only once, in the foregoing system, the information transmitting apparatus enciphers the flag information together with the order information in place of the date and time information D and transmits the enciphered information to the user information collecting apparatus. The user information collecting apparatus can execute a process for checking whether the order is accepted or not by the flag information.

Further, according to the above system, in the processes in FIGS. 13 and 15, although the personal ID number inputted by the user has been used as key information, the key information recorded in the recording medium in the user information transmitting apparatus can be also used. In this case, however, the information transmitting apparatus must have a function such as to prevent that the key information recorded in the recording medium is accessed from the outside. By such a function, an illegal ordering by the third party from spite which doesn't have the information transmitting apparatus can be prevented. Upon transmission, the inconvenience of a user having to input personal ID information every time can be omitted.

Further, in the above system, the authorizing function shown in the process example of FIG. 11 or the process examples of FIGS. 13 and 15 has been applied to the information transmitting apparatus for transmitting the user information such as order information or the like by the radio transmitting means such as wireless radio waves, infrared rays, or the like. However, for example, the authorizing function can be also applied to the information recording reproducing apparatus for transmitting the user information through the information terminal shown in the prior art.

Further, in the above system, as an enciphering method, the same key has been used for enciphering and decoding. However, for example, it is also possible to use what is called a public key cryptography disclosed in 1982 D. E. R. Denning, "Cryptography and Data Security", Addison-Wesley Publishing Company, Inc., ReadingnMass., U.S.A. Namely, according to such an enciphering method, a secret key is used upon enciphering and a public key is used upon decoding.

Further, according to the above system, either one of the processes in FIG. 11 and the processes in FIGS. 13 and 15 can be omitted. However, to raise a safety, it is desirable to execute all of the processes in FIG. 11 and the processes in FIGS. 13 and 15. Particularly, according to the processes in FIGS. 13 and 15, since it is possible to prevent the illegal ordering by not only the person who possesses the information transmitting apparatus but also the third party from spite, it is desirable not to omit the above processes.

Figure 16:
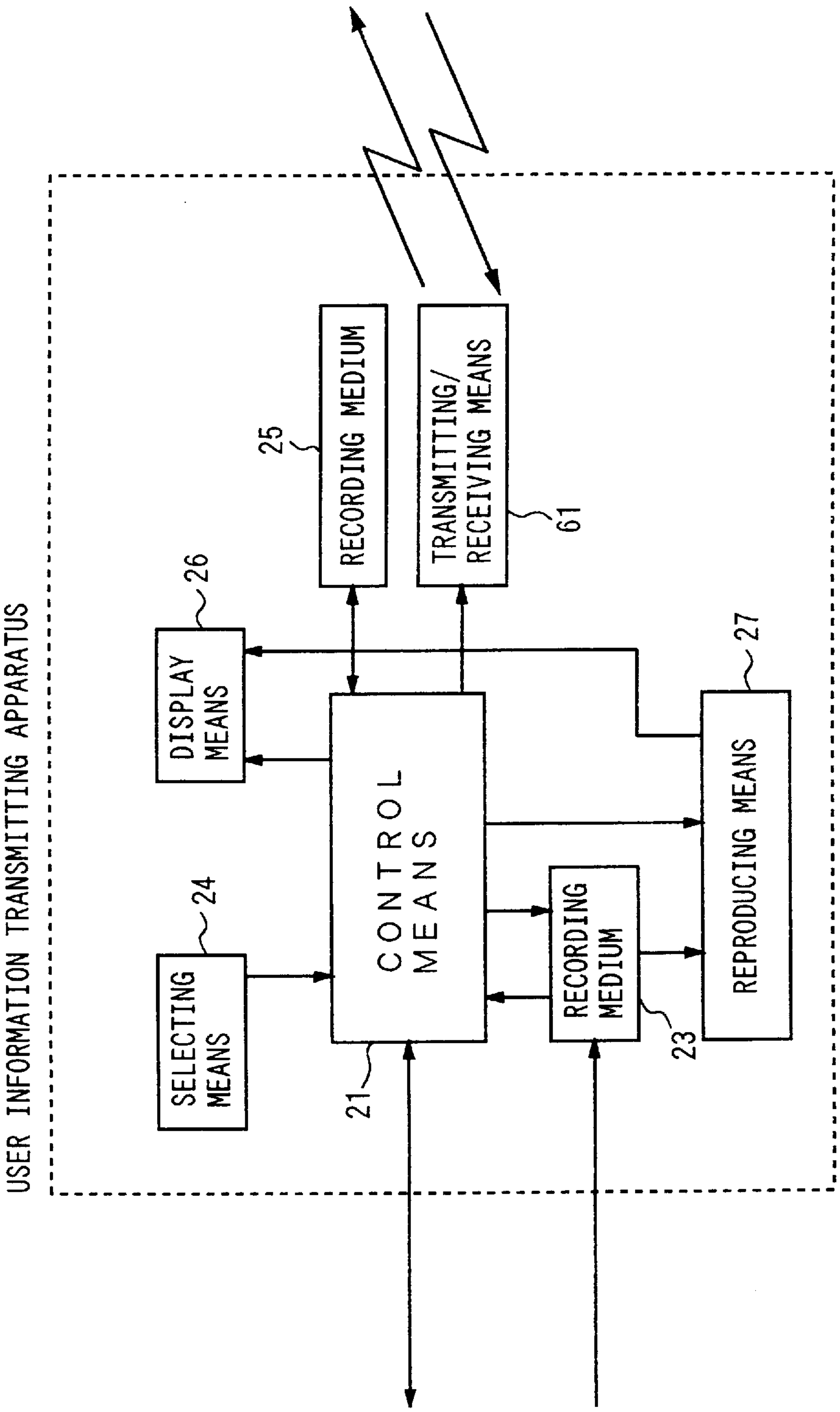
FIG. 16 is a block diagram showing another embodiment of the user information transmitting apparatus according to the invention.
Figure 17:
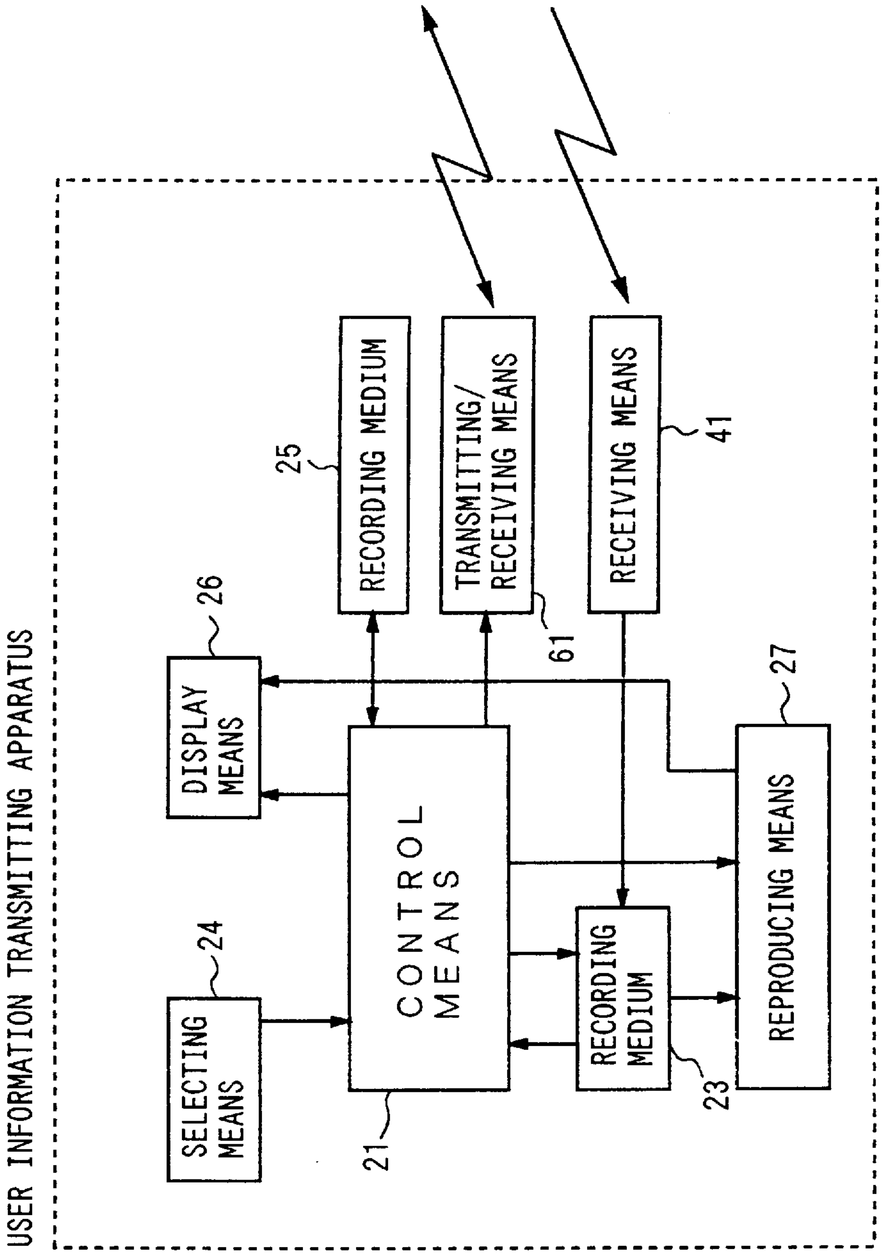
FIG. 17 is a block diagram showing yet another embodiment of the user information transmitting apparatus according to the invention.

As another embodiment, it is also possible to construct in a manner such that the transmitting means is provided for the user information collecting apparatus and, at the time point when the order is accepted, the user information collecting apparatus transmits order acceptance information to the user information transmitting apparatus through the transmitting means. In this case, for example, as shown in FIG. 16 or 17, in place of the transmitting means, transmitting/receiving means 61 is provided for the user information transmitting apparatus and the user information transmitting apparatus receives the order information sent from the user information collecting apparatus and can display the order information through the display means 26. With this method, since the user can soon confirm that the order has been accepted, it is convenient. It is also possible to construct such that the user information transmitting apparatus once records reservation acceptance information into the recording medium and the reservation acceptance information is displayed as necessary.

Although the case of ordering the article has been described above as an example, the invention can be also used to, for example, request references such as brochure or the like. Further, the invention can be also applied to the collection of visual and audio information, collection of answers to quiz or questionnaire, or the like.

The information collected in many user information collecting apparatuses installed at various locations is collected to the center and the collected information is statistically processed, so that the data regarding the more significant useful information use can be obtained. In the case where the transmitting means is provided for the user information collecting apparatus, the conditions from the user information collecting apparatus to the user information transmitting apparatus can be also changed in accordance with the information that is sent from the user information transmitting apparatus to the user information collecting apparatus.

For example, in case of cooperating with the above questionnaire, the value of the necessary degree d to obtain information is reduced. With this method, the information user can more cheaply obtain the information and the information presenter can expect the questionnaire results from a larger number of users. In case of providing quiz information, the value of necessary degree d can be also changed in dependence on a ratio of correct answers. With this method, the information user can enjoy games.

As will be also obviously understood from the above description, according to the invention, since the transmitting means has been provided for the user information transmitting apparatus, a practical ordering system by the advertisement information can be constructed. The viewer can promptly and certainly execute the order information and references request information on the basis of the advertisement information. According to the invention, since the user information transmitting apparatus has the authorizing function, even if the user information transmitting apparatus is stolen by another person, the spiteful use of the user information transmitting apparatus or other types of false ordering can be prevented.

The present invention is not limited to the foregoing embodiments but many modifications and variations are possible within the spirit and scope of the appended claims of the invention.

What is claimed is:

1. An information transmitting apparatus for ordering at least one desired article by referring to advertising information regarding articles, comprising:

a housing;

information reproducing means for reproducing the advertising information stored in a recording medium;

information input means arranged on said housing for inputting information corresponding to desired article information of a user, the user referring to the advertising information reproduced by the information reproducing means; and wireless transmitting means for transmitting in a wireless manner order information of the user corresponding to the input information inputted by using said information input means.

2. An apparatus according to claim 1, wherein the transmitted information is remotely transmitted, further comprising:

information recording means for recording the order information, wherein said information recording means includes a recording medium in which said order information is recorded, and said information reproducing means reproduces the order information recorded in said information recording means.

3. An apparatus according to claim 1, wherein the transmitted information is remotely transmitted, further comprising:

wireless information receiving means for receiving in a wireless manner the transmitted information, wherein said information reproducing means reproduces the transmitted information received by said wireless information receiving means.

4. An apparatus according to claim 3, further comprising:

information recording means for temporarily recording the transmitted information received by said wireless information receiving means, wherein said information recording means includes a recording medium in which said transmitted information received by said wireless information receiving means is temporarily recorded, and said information reproducing means reproduces said temporarily recorded transmitted information.

5. An apparatus according to claim 1, further comprising:

information storage means including a recording medium in which a personal identification number has been recorded; and user authorizing means for comparing a personal identification number of the user inputted into said information input means and said personal identification number recorded in said recording medium.

6. An apparatus according to claim 1, further comprising:

encipher means for enciphering said order information.

7. An apparatus according to claim 6, wherein said encipher means enciphers said order information by using a personal identification number inputted by said user using said information input means.

8. An apparatus according to claim 6, further comprising:

information storage means including a recording medium in which secret information has been recorded, wherein said encipher means enciphers said order information by using said secret information recorded in said recording medium.

9. An apparatus according to claim 5, further comprising:

encipher means for enciphering said order information, wherein said recording medium includes secret information, and said encipher means enciphers said order information by using said secret information recorded in said recording medium.

10. An apparatus according to claim 6, wherein said encipher means enciphers said order information utilizing a variable code indicative of said transmitted information, and a fixed code which is not indicative of said transmitted information.

11. An apparatus according to claim 6, wherein said encipher means enciphers order information in which variable information indicative of said transmitted information is arranged in accordance with a predetermined rule.

12. An apparatus according to claim 1, further comprising:

display means for displaying said information reproduced by said information reproducing means.

13. An information transmitting apparatus for ordering at least one desired article by referring to advertising information regarding articles, comprising:

a housing;

information reproducing means for reproducing the advertising information stored in a recording medium;

information input means arranged on said housing for inputting information corresponding to desired article information of a user, the user referring to the advertising information reproduced by the information reproducing means;

user authorizing means for authorizing the user by inputting a personal identification number of the user into said information input means; and information transmitting means for transmitting order information corresponding to said information input to said information input means.

14. An apparatus according to claim 13, further comprising:

information storage means including a recording medium in which secret information has been recorded, wherein said user authorizing means compares a personal identification number of the user inputted to said information input means and a personal identification number recorded in said recording medium of said information storage means in order to authorize the user.

15. An apparatus according to claim 13, further comprising:

information recording means for recording order information, said order information being remotely transmitted, wherein said information recording means includes a recording medium in which said order information is recorded, and said information reproducing means reproduces the order information recorded in said information recording means.

16. An apparatus according to claim 13, further comprising:

wireless information receiving means for receiving, in a wireless manner, the transmitted information, said transmitted information being remotely transmitted, wherein said information reproducing means reproduces the transmitted information received by said wireless information receiving means.

17. An apparatus according to claim 16, further comprising:

information recording means for temporarily recording the transmitted information received by said wireless information receiving means, wherein said information recording means includes a recording medium in which said transmitted information received by said wireless information receiving means is temporarily recorded, and said information reproducing means reproduces said temporarily recorded transmitted information.

18. An apparatus according to claim 13, further comprising:

encipher means for enciphering said order information.

19. An apparatus according to claim 18, wherein said encipher means enciphers said order information by using a personal identification number inputted by said user using said information input means.

20. An apparatus according to claim 13, further comprising:

information storage means having a recording medium in which secret information has been recorded, wherein said encipher means enciphers said order information by using said secret information recorded in said recording medium.

21. An apparatus according to claim 14, further comprising:

encipher means for enciphering said order information, wherein said recording medium has therein secret information, and said encipher means enciphers said order information by using said secret information recorded in said recording medium.

22. An apparatus according to claim 18, wherein said encipher means enciphers said order information utilizing a variable code indicative of the transmitted information, and a fixed code which is not indicative of the transmitted information.

23. An apparatus according to claim 18, wherein said encipher means enciphers the order information in which variable information indicative of the transmitted information is arranged in accordance with a predetermined rule.

24. An apparatus according to claim 13, further comprising:

display means for displaying said information reproduced by said information reproducing means.

25. An information transmitting system for ordering at least one desired article by referring to advertising information regarding articles, comprising:

a housing;

at least one information transmitting apparatus; and at least one information collecting apparatus, wherein said information transmitting apparatus comprises:

information reproducing means for reproducing the advertising information stored in a recording medium, information input means arranged on said housing for inputting information corresponding to desired article information of a user, the user referring to the advertising information reproduced by the information reproducing means; and wireless transmitting means for transmitting in a wireless manner order information corresponding to the input information inputted by using said information input means, wherein said information collecting means comprises:

wireless receiving means for receiving the transmitted information from said wireless transmitting means.

26. A system according to claim 25, wherein said information transmitting apparatus further comprises:

information recording means for recording order information, said order information being remotely transmitted; and and said information recording means comprises:

a recording medium in which said order information is recorded, wherein said information reproducing means reproduces the order information recorded in said information recording means.

27. A system according to claim 25, wherein:

said information collecting apparatus further comprises:

acceptance information transmitting means for transmitting acceptance information indicating that the transmitted information from said wireless transmitting means of said information transmitting apparatus was accepted; and said information transmitting apparatus further comprises:

receiving means for receiving said acceptance information from said acceptance information transmitting means of said information collecting apparatus.

28. A system according to claim 25, wherein said information collecting apparatus further comprises:

authorizing means for authorizing said order information to decide whether said order information is correct or not.

29. A system according to claim 28, wherein said information collecting apparatus further comprises:

authorization confirmation information transmitting means for transmitting authorization information on the basis of an output of said authorizing means; and said information transmitting apparatus further comprises:

receiving means for receiving said authorization information from said information collecting apparatus.

30. A system according to claim 25, wherein said information transmitting apparatus further comprises:

information storage means including a recording medium in which a personal identification number has been recorded; and user authorizing means for comparing a personal identification number of the user inputted by said information input means and the personal identification number recorded in said recording medium in order to authorize the user.

31. A system according to claim 25, wherein said information transmitting apparatus further comprises:

encipher means for enciphering said order information, wherein said information collecting apparatus further comprises:

decoding means for decoding the enciphered order information.

32. A system according to claim 31, wherein said information collecting apparatus further comprises:

authorizing means for authorizing said order information to decide whether said order information is correct, wherein said encipher means enciphers said order information using a variable code indicative of the transmitted information and a fixed code not indicative of the transmitted information; and said authorizing means determines whether said fixed code in said order information decoded by said decoding means has correctly been decoded.

33. A system according to claim 31, wherein said information collecting apparatus further comprises:

authorizing means for authorizing said order information to decide whether said order information is correct, wherein said encipher means enciphers the order information in which variable information indicative of the transmitted information is arranged in accordance with a predetermined rule; and said authorizing means determines whether said order information decoded by said decoding means is correctly arranged in accordance with said predetermined rule.

34. A system according to claim 25, wherein said information transmitting apparatus further comprises:

display means for displaying said information reproduced by said information reproducing means.

35. A system for ordering at least one desired article by referring to advertising information regarding articles, comprising:

a housing:

at least one information transmitting apparatus; and at least one information collecting apparatus, wherein said information transmitting apparatus comprises:

information storage means having a recording medium in which advertisement information of the articles has been recorded, information reproducing means for reproducing said advertisement information recorded in said recording medium, information display means for displaying information corresponding to said advertisement information reproduced by said information reproducing means, information input means arranged on said housing for inputting information corresponding to desired article information for the user, by said user by referring to the information displayed by said display means, and information transmitting means for transmitting order information of the user corresponding to the information inputted by said information input means; and wherein said information collecting apparatus comprises:

wireless receiving means for receiving said order information from said wireless transmitting means.

* * * * *